Sept. 9, 1924.  
J. G. MOOMY  
PIPE CONNECTION  
Filed April 21, 1922

1,508,023

Inventor  
Joseph G. Moomy  
by H. L. Lord  
Attorney

Patented Sept. 9, 1924.

1,508,023

UNITED STATES PATENT OFFICE.

JOSEPH G. MOOMY, OF ERIE, PENNSYLVANIA, ASSIGNOR TO MARY H. MOOMY, OF ERIE, PENNSYLVANIA.

PIPE CONNECTION.

Application filed April 21, 1922. Serial No. 555,801.

*To all whom it may concern:*

Be it known that I, JOSEPH G. MOOMY, a citizen of the United States, residing at Erie, in the county of Erie and State of Pennsylvania, have invented new and useful Improvements in Pipe Connections, of which the following is a specification.

This invention is particularly designed to form the connection between the engine and radiator in automobiles but may be used for other connections if desired. In carrying out the invention I utilize a rubber coupling so as to take up any inequalities in distances and permit of its ready insertion between the fixed ends of the pipes to which it is connected. I provide the rubber connection with engaging annuli which are provided with means for assuring a water-tight joint.

The invention is illustrated in the accompanying drawings as follows:—

Figure 1:
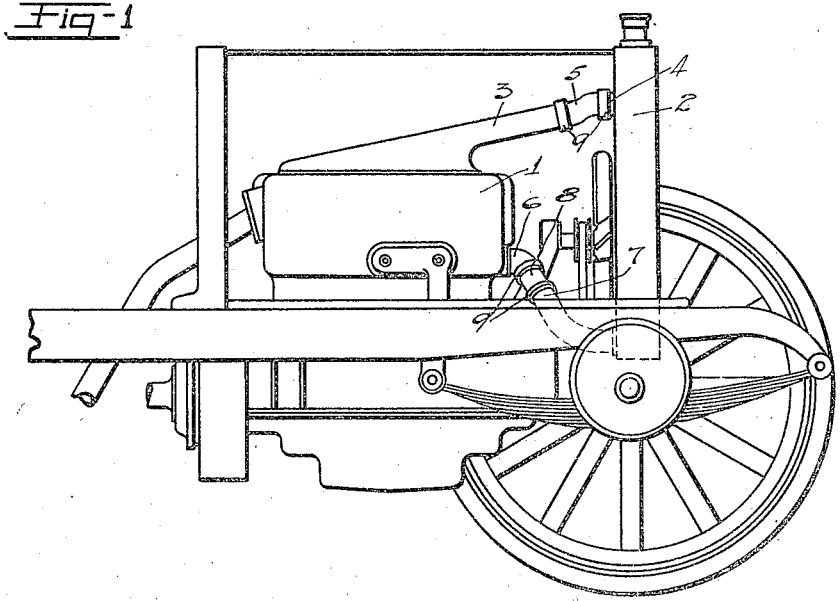

Fig. 1 shows a part of an automobile showing the method of attachment.

Figure 2:
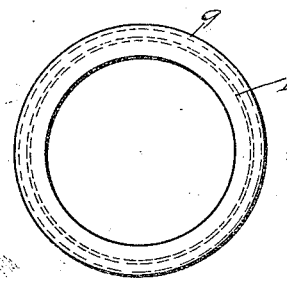

Fig. 2 an end view of the connection.

Figure 3:
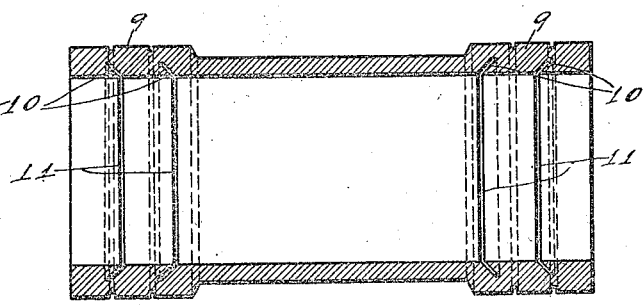

Fig. 3 a central longitudinal section through the connection.

1 marks the engine, 2 the radiator, 3 an upper pipe extending from the engine, 4 the upper pipe on the radiator, 5 a connection between the pipes 3 and 4, 6 the lower pipe on the engine, 7 the lower pipe on the radiator, and 8 a connection between the pipes 6 and 7. The connections 5 and 8 are similar. The connections 5 and 8 are provided with engaging annuli 9. The ends of the rubber tube form the walls for these engaging annuli. Internally opening inwardly inclined slits 10 are formed in the walls of the engaging annuli, thus forming lips 11 which engage the pipes to which the connection is attached. By making these slits inclined any leakage into these slits tends to form a slight pressure on the lips 11, thus assuring a more complete seal and the lips also tend to grip the pipe with greater certainty.

It will be noted that the walls of the tube adjacent to the slits are cylindrical thus making a close surface contact with the pipe. By reason of this after some use there is a certain amount of adhesion between the rubber surface and the pipe which makes the connection more secure, the slits assuring the initial closure. Further the plurality of slits is adapted to take care of inequalities of the pipe. The heavier wall of rubber also between the slits gives it greater strength and sufficient adhesion so that an attempt to withdraw results in a flexing of these parts so as to more fully grip the pipe.

What I claim as new is:—

1. A pipe connection having an expansible rubber engaging annulus, said annulus having internally opening inwardly inclined slits extending into the walls of the annulus, the slits being relatively thin and the intervening walls between the slits relatively thick and the walls of the connection adjacent to the slits being cylindrical.

2. A pipe connection having an expansible rubber engaging annulus, said annulus having annular internally opening inwardly inclined slits extending into the walls of the annulus, the slits being relatively thin and the intervening walls between the slits relatively thick and the walls of the connection adjacent to the slits being cylindrical.

3. A pipe connection having an expansible rubber engaging annulus, said annulus having an internally opening inwardly inclined slit extending into the wall of the annulus, the walls of the connection adjacent to the slit being cylindrical, the slit being relatively thin and the walls each side of the slit being relatively thick.

In testimony whereof I have hereunto set my hand.

JOSEPH G. MOOMY.